United States Patent [19]
Brownrigg

[11] 3,921,760
[45] Nov. 25, 1975

[54] MODULAR DIVISIONAL FEEDER

[75] Inventor: Richard T. Brownrigg, Shaker Heights, Ohio

[73] Assignee: Houdaille Industries, Inc., Buffalo, N.Y.

[22] Filed: Mar. 10, 1975

[21] Appl. No.: 556,781

[52] U.S. Cl. .................................... 184/7 E
[51] Int. Cl.² .................... F01M 1/06; F16N 7/14
[58] Field of Search .......... 184/7 R, 7 CR, 7 D, 7 E, 184/7 F, 12, 61

[56] References Cited
UNITED STATES PATENTS

| | | | |
|---|---|---|---|
| 2,792,911 | 5/1957 | Harter | 184/7 E |
| 3,219,146 | 11/1965 | Leese | 184/7 F |
| 3,409,104 | 11/1968 | Acker | 184/7 E |
| 3,422,926 | 1/1969 | Stanaway | 184/7 FY |
| 3,438,463 | 4/1969 | Gruber | 184/7 E |

Primary Examiner—Richard J. Apley
Assistant Examiner—Marvin Siskind
Attorney, Agent, or Firm—Hill, Gross, Simpson, Van Santen, Steadman, Chiara & Simpson

[57] ABSTRACT

A cyclic, single line lubricant distributor, utilizing a pair of end members and a plurality of intermediate members sequentially disposed in a line therebetween, with each member in abutting engagement with the adjacent preceding member, each intermediate member having a reciprocable piston and hydraulic circuitry cooperable with hydraulic circuitry in the other of said members for hydraulically effecting, in known manner, sequential or progressive displacement of the respective pistons from one limiting position to another, each member having a portion overlying a cooperable portion of the adjacent member in direction transverse to said line, each successive member being independently connected with the preceding member by respective connectors extending transversely to said line, the meeting faces of cooperable overlying portions of adjoining members having mating fluid ports opening thereon for the operative connection of the fluid circuitry of such members, with said connectors applying compression forces to such cooperable meeting faces.

8 Claims, 5 Drawing Figures

MODULAR DIVISIONAL FEEDER

BACKGROUND OF THE INVENTION

The invention is directed to a lubricant distributor of cyclic, single line type, providing a progressive distribution of lubricant to a plurality of points of use.

Distributors of this type are generally known and employ a plurality of reciprocable pistons which are adapted to be hydraulically actuated from one limiting position to another, with the respective pistons also functioning as valve members to effect changes in hydraulic flow, whereby the pistons are sequentially or progressively actuated. In each movement of a piston, a measured or metered amount of lubricant is discharged from the unit. Consequently, as long as a supply of lubricant under pressure is supplied to the device, specific amounts of lubricant will be distributed to the respective points of use.

To provide flexibility of construction, particularly with respect to the number of distribution points accommodated, distributors of the type here involved have employed a modular construction comprising a plurality of sections or members, including a pair of end members and a plurality of intermediate members disposed in a line therebetween, each intermediate member containing an actuating piston and adapted to sequentially supply lubricant at two respective discharge ports therein. Prior systems of this type have utilized respective modules in the form of rectangular blocks which are disposed in aligned relation and secured together by a pair of tie rods, or the like, extending through aligned openings in each of the sections or members. The respective members are provided with passageways therein which interconnect the lubricant inlet port, respective pistons and discharge ports for the desired sequential or progressive operation. The intermediate members, containing the actuating pistons, are of identical construction, and the hydraulic circuitry of the respective members is adapted to be operatively connected from member to member by aligned mating ports in cooperable meeting faces of adjoining members. The end sections or members are merely provided with suitable passageways adpated to provide the completing circuitry for the system, and one of such members may include the inlet port for the lubricant.

Exemplary of the various patents illustrative of the constructions of this general type is that illustrated in U.S. Pat. No. 2,792,911 granted on May 27, 1957 to R. L. Harter.

It will be appreciated that in such type of construction, wherein the respective intermediate and end members are in the form of rectangular blocks, secured together by common tie means extending through all of such blocks interchange of a block requires the disconnection of the means common to all of the associated blocks. More importantly, as such common means are employed for the retention of the blocks in assembled relation, stresses may develop as a result thereof, for example, in consequence of a cumulative tolerance buildup, sufficient to create a binding action on one or more pistons. It will be appreciated that as the lubricant pressures may be considerable, for example, on the order of 1,000 psi or more, the connecting means must clamp the respective module blocks with relatively high pressure on the O-rings or other sealing means employed at the mating ports to prevent leakage, and distortion of the individual members or blocks thus can take place relatively easily.

BRIEF SUMMARY OF THE INVENTION

The present invention is directed to a lubricant distributor in which the respective modular sections or members are provided with a novel configuration, which eliminates the use of tie rods and corresponding elimination of the normal distortion found in prior assemblies, with each individual section block being secured to an adjacent section block by individual means independent of the securing means of other sections. Thus, any section may be readily separated from an adjacent section without disturbing the connection of the remaining sections of the structure.

This is accomplished by the utilization of end and intermediate sections or members, disposed in a line, with each member having a portion overlying a cooperable portion of the adjacent member in direction transverse to such line and with the connecting means likewise extending transversely to such line and connecting overlying portions of adjoining members. The cooperable meeting faces of overlying portions of such members are provided with mating fluid ports opening thereon for the operative connection of the fluid circuitry of such members, and with such connecting means independently applying the desired compression forces on each such pair of cooperable meeting faces.

Each intermediate member is provided with respective lubricant outlet ports, and any one of the members may be provided with a lubricant inlet port, preferably one of the end sections containing such inlet.

As each individual section is connected to each adjacent section by individual and independent connecting means, additional intermediate or feeder sections can be added, deleted or interchanged without alterations and without requiring an operative disconnection of any of the other sections. The construction enables the use of merely mating ports between sections, eliminating grooves and necessary gasketed faces whereby O-rings or other effective high pressure sealing means may be readily employed.

Likewise, the construction readily enables the use of alternate outlets in each section, and if desired, alternate inlets.

Any suitable hydraulic circuitry may be employed, in dependence upon the specific operational requirements and that illustrated in the drawings, for the purposes of illustration, corresponds to the system illustrated in the previously referred to British Patent No. 524,403.

BRIEF DESCRIPTION OF THE DRAWINGS

In the drawings wherein like reference characters indicate like or corresponding parts.

DETAILED DESCRIPTION OF THE INVENTION

Figure 1:
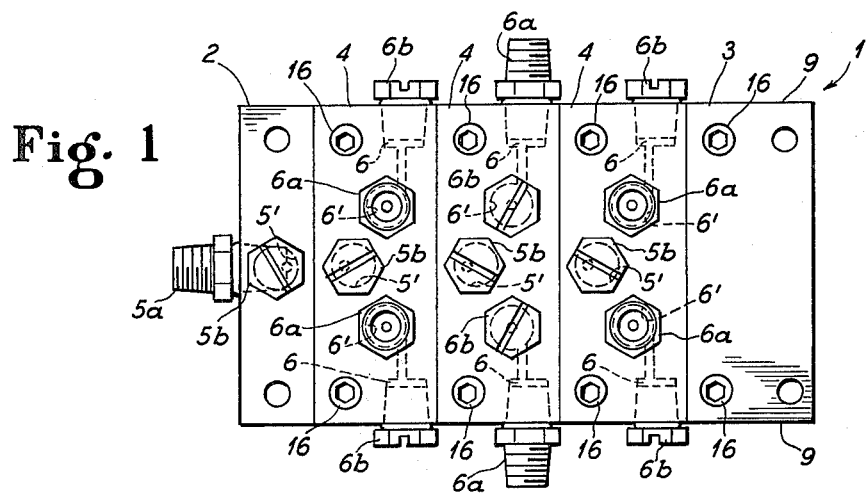
FIG. 1 is a top plan view of a lubricant distributor embodying the invention.
Figure 2:
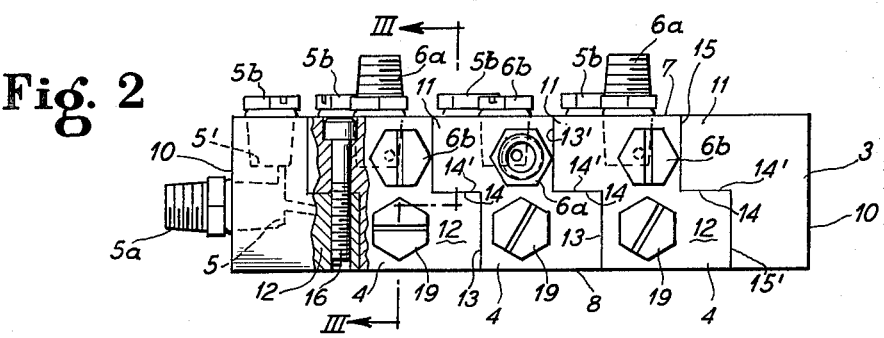
FIG. 2 is a side elevational view of the structure illustrated in FIG. 1.

Referring to the drawings and particularly to FIGS. 1 and 2, the reference numeral 1 indicates generally a lubricant distributor comprising a plurality of interconnected sections having, in the embodiment illustrated, a pair of end members 2 and 3 between which are interposed a plurality of intermediate members 4. Any desired number of intermediate members may be employed, three being illustrated in the drawings for the purposes of explanation. In the embodiment illustrated the member 2 is provided with an inlet port 5 and alternate inlet port 5', for the supply of lubricant to be distributed, with the port 5 being provided with a threaded fitting or nipple 5a for the operative connection of a lubricant supply line thereto, and the port 5' sealed by a screw plug 5b. Each of the members 4 are provided with lubricant discharge ports 5 opening on the end walls of the sections and alternate outlet ports 5' opening on the top face of the distributor. Thus, by providing the selected outlet with a tube fitting 5a and plugging the alternate outlet associated therewith by a screw plug 5b, the various outlets may be selected for best compatibility with the lines which are to be connected to the respective outlets. In like manner an inlet 5' may be provided in each member 4, illustrated as being closed by respective screw plugs 5b.

In the embodiment of the invention illustrated the lubricant distributor 1 is in the form of a rectangularly shaped assembly, with the members 2, 3 and 4 having top faces 7, bottom faces 8, end faces 9 with the exposed side walls 10 of the respective end members defining the end wall of the elongated rectangular shape distributor 1.

Figure 4:
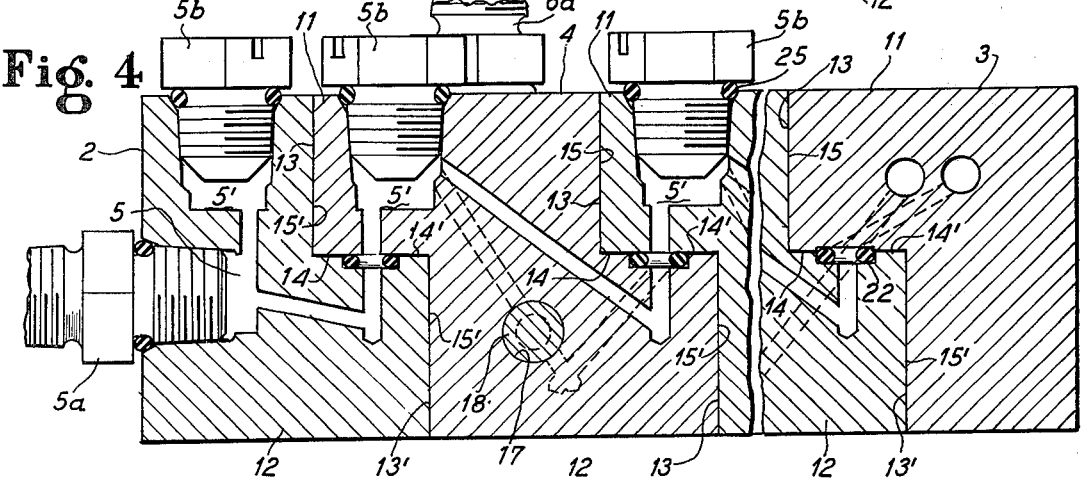
FIG. 4 is a sectional view taken approximately on the line IV-IV of FIG. 1.

As illustrated in FIGS. 2 and 4, the respective members 2, 3 and 4 which are constructed in the form of more or less rectangular-shaped blocks of metal or other suitable material, are provided with complementary adjoining edges whereby each block has a portion 11 which overlies the adjacent cooperable, and thus underlying portion 12. Each member 4 has a side wall 13 offset from the adjacent side wall 13', which are connected at their adjacent edges by an intermediate wall 14. Likewise, at the opposite side of each such member are similar, but oppositely offset, side walls 15 and 15' connected at their adjacent edges by an intermediate wall 14'. The sides of each member 4, respectively defined by the walls 13, 14 and 13' thus are complemental to the walls 15, 14' and 15'. In like manner the inlet member 2 is provided with corresponding side walls 15, 14' and 15' while the end member 3 is provided with complemental side walls 13, 14, 13'.

Thus, any number of intermediate blocks or sections 4 may be interposed between the end members 2 and 3 to form a distributor structure of any desired line capacity. As clearly illustrated in FIGS. 1, 2 and 3, each member 2, 3 or 4 is adapted to be independently secured to the adjacent preceding or succeeding member by respective pairs of bolts 16, each of which is illustrated as extending through a respective overlying portion 11 and threaded into the cooperable underlying portion 12. As a result of this construction, no compression forces are applied to the distributor assembly from one end member to the other i.e. in a direction parallel to the longitudinal line of assembly of the series of members. On the contrary, all compression forces are directed transverse to such line i.e. vertically as viewed in FIG. 2, between the overlying or underlying portions 11 and 12, respectively, of the respective members.

Figure 3:
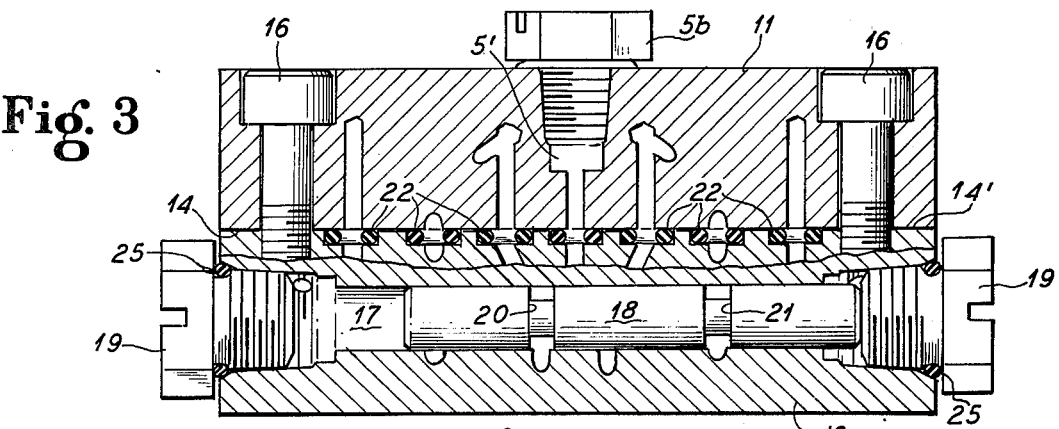
FIG. 3 is a sectional view taken approximately on the line III-III of FIG. 2.

As illustrated in FIGS. 3 and 4 each of the members 4 is provided with a bore 17 therein, in which is disposed a piston structure 18, and which is freely reciprocable therein, with the ends of the bore being operatively closed by respective threaded plugs 19. Each piston is provided, in the embodiment illustrated, with a pair of grooves 20 and 20' and three lands 21a, 21b and 21c.

Each piston 18 serves a dual purpose, forming both the actuating means for discharging a measured amount of lubricant from the distributor, as well as providing a valve action for controlling the operation of the respective pistons. To achieve these results, it is necessary that the respective members 2, 3 and 4 contain passageways that will channel the lubricant in the desired directions, under the control of the pistons 18, which in turn necessitates the operative connection of such passageways between one member and the next.

As previously mentioned in prior constructions, the blocks making up the distributor were provided with planar side walls or faces disposed in abutting relation and lying in parallel planes, normal to the direction of assembly of the structure, with the blocks of the structure being retained in assembled relation by tie bolts extending through all of the blocks, along lines parallel to the line of assembly, with the meeting faces of adjoining blocks extending in planes normal to the line of assembly. As a result compression forces were directed continuously through all blocks, as a result of which it was possible to have distortion take place in the piston bores, with possible restricting forces impeding piston movement.

In contrast thereto, in the present construction the porting between members 2, 3 and 4 takes place at the intermediate meeting faces 14 and 14' of adjoining members. Referring to FIGS. 3 and 4, in the embodiment illustrated, each of the faces 14' are provided with a recess 22 of a size to receive a sealing gasket or the like, which may be in the form of an O-ring 23, adapted to engage the face 14', illustrated as being planar, whereby the O-ring will be compressed when the respective members have been rigidly connected to one another by the respective screws 16. It will be particularly noted that in this construction the compression forces exerted by the bolts 16 are directed transversely to the line of assembly i.e. in the specific embodiment illustrated at right angles thereto, with such compression forces applied between the overlying and underlying portions 11 and 12 of each member, and thus offset along the line of assembly with respect to the associated piston 18 whereby such compression forces do not intersect the corresponding bore 17 and thus cannot exert undesirable distortion in that portion of the member in which the bore 17 is disposed.

It will also be noted that in this construction the assembly may be separated at the juncture of any pair of blocks without affecting the connection between the remaining blocks, as a result of which blocks 4 may be readily added, deleted or interchanged without a disassembly of the remaining structure.

As illustrated in FIGS. 3 and 4, unused inlet port 3 or 3' or outlet port 6 or 6' plugged by screw plugs 5b or 6b may be effectively sealed by suitable means as for example O-rings 25 disposed between the head of the screw plug and the adjacent portion of the cooperable member, with the screw plugs 19 being correspondingly sealed by O-rings 25.

THE HYDRAULIC CIRCUITRY

As previously mentioned, any suitable hydraulic circuitry may be employed to achieve a desired actuation and operation of the pistons 18 and discharge of lubricant from the distributor. In the embodiment illustrated, for the purposes of explanation, the hydraulic circuit employed, diagrammatically illustrated in FIG. 5, corresponds substantially to that illustrated in FIG. 1 of British Patent No. 524,403, the circuitry of FIG. 5, however, not employing check valves such as illustrated in such patent.

Figure 5:
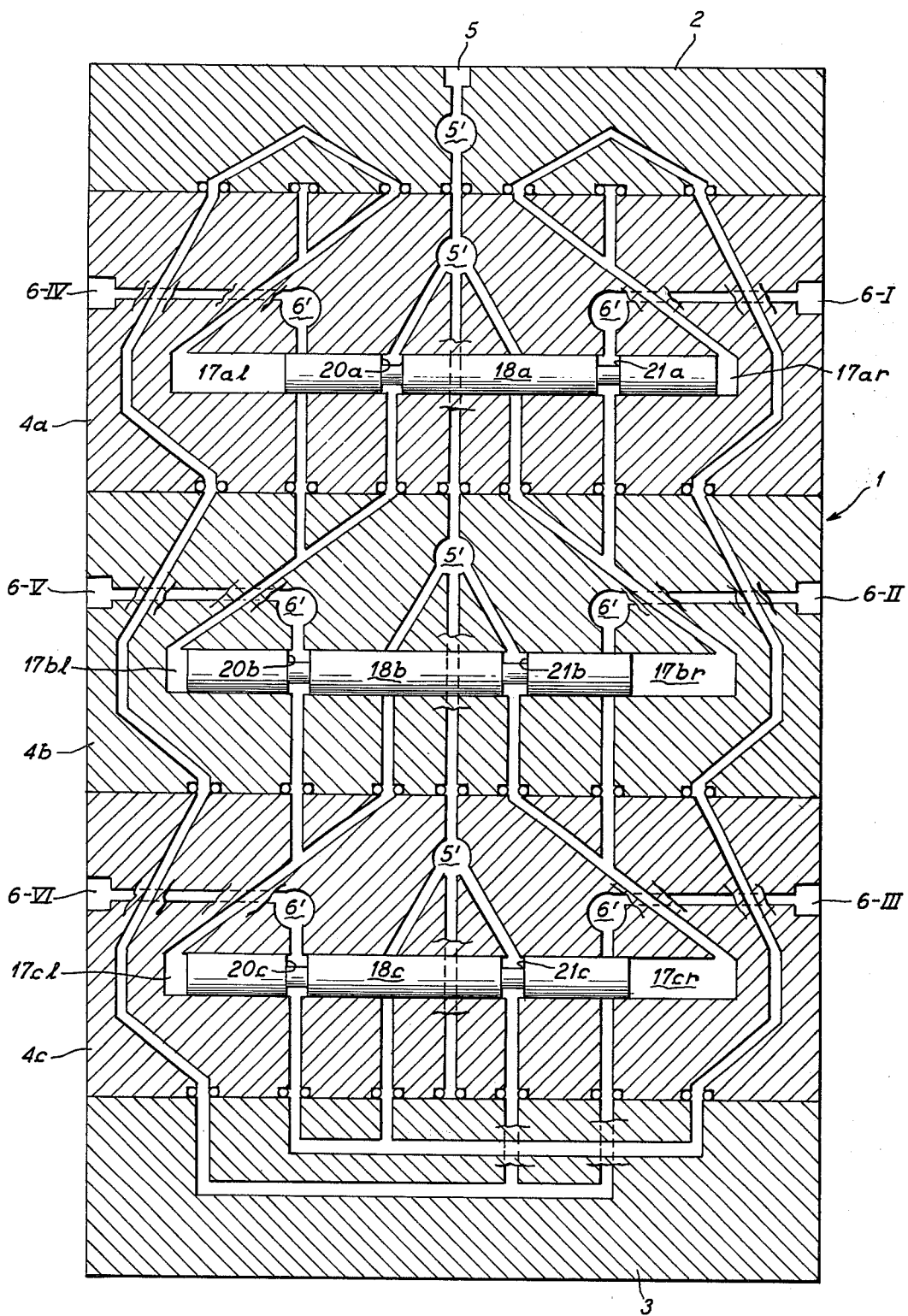
FIG. 5 is a semidiagrammatic diagram of the hydraulic circuitry of the structure illustrated in FIG. 1.

As FIG. 5 illustrates a known form of circuitry, it will be merely briefly described without specific reference to each passageway in the various blocks, other than as may be necessary to clearly explain the operation.

To facilitate consideration of the operation of the structure illustrated in FIG. 5, the members 4 will be respectively designated 4a, 4b and 4c, with the bores 17, pistons 18 and grooves 20 and 21 being correspondingly identified for the respective members. Likewise, for convenience, the ends of the respective bores 17 will be further identified by the letter i or r, correspondingly designating the left-hand or right-hand of such bore, i.e. 17al, 17ar etc.

Assuming that the respective pistons 18 are in initial positions illustrated in FIG. 5, with piston 18a adjacent the end 17ar, and the other two pistons 18b and 18c disposed respectively at the ends 17bl, and 17cl, lubricant may flow from the inlet 5 through groove 20a of piston 18a to the left end 17bl of the bore 17b to move the piston 18b to its right end position, forcing lubricant at end 17br through groove 21a and discharge thereof from the distributor through outlet port 6-I. When the piston 18b has completed its travel to the right a circuit is completed from the inlet 5 through groove 20b to the left-hand end 17cl of bore 17c, supplying lubricant thereto and moving the piston 18b to its right-end position, thereby discharging lubricant, in the end 17cr, from the structure through outlet port 6-II.

Movement of the piston 18c to its right-end position correspondingly completes a third circuit from the inlet port 5 through groove 20c and through corresponding passages in the respective members to the right-end 17ar, of the bore 17a, to move the piston 18a from its right-end to its left-end limiting position, thereby forcing lubricant in such bore end through connected passageways in the respective members 4a, 4b and 4c, through groove 21c of the piston 18c, and discharge from the structure through outlet port 6-III.

With disposition of the piston 18a at its left-end limiting position the inlet port 5 is operatively connected through groove 21a with the right-hand end 17br of the bore 17b, to return piston 18b to its initial position at the left-end 17bl of such bore, thereby forcing lubricant in such end through groove 20a of piston 18a, and discharge out of outlet port 6-IV.

With the piston 18b in its initial left-end position, the inlet port 5 is now connected by groove 21b with the right end 17cr, of the bore 17c, thereby moving the piston 18c to its left-end position with lubricant at the end 17cl being forced through groove 20c and discharged through the outlet port 6-V.

With the return of piston 18c to its left-end limiting position a circuit is now completed for the flow of lubricant from the inlet port 5 through groove 21c of piston 18c, and connected passageways in the respective members, to the left-end 17al of bore 17a, operative to move the piston 18a to its initial right-end position, forcing lubricant from the right-end 17ar of the bore 17a, through corresponding passageways in the respective members, through groove 20c of the piston 18c and discharge thereof from the outlet port 6-VI. Such movement of the piston 18a completes one cycle of the system, with the respective pistons now being in the initially assumed positions and ready to begin another cycle.

It will be appreciated that while the operation of the respective pistons is sequential or progressive, interim periods of inoperation may be readily determined by control of the supply of lubricant to the inlet 5. Thus, the lubricant may be supplied under pressure at intermittent periods of predetermined duration, with one or more cycles of operation taking place at each operating period.

It also will be appreciated that while I have illustrated the use of pistons with two grooves and three lands, the configuration of the respective members, arrangement of connecting ports, and individual independent connecting means may be employed with any suitable hydraulic circuitry and piston construction.

Likewise, what I have illustrated all of the meeting faces of the respective blocks carrying the mating ports, as lying in a common plane extending parallel to the line of assembly, it is believed apparent that invention is applicable to other complementary configurations. However, for reasons of simplicity of construction and assembly, and thus reduced manufacturing costs, it is believed that in most cases the parallel construction is preferable.

Having thus described my invention it will be obvious that although various minor modifications might be suggested by those versed in the art, it should be understood that I wish to embody within the scope of the patent granted hereon all such modifications as reasonably, and properly come within the scope of my contribution to the art.

I claim as my invention:

1. In a cyclic, single line lubricant distributor, comprising a pair of end members and a plurality of intermediate members sequentially disposed in a line therebetween, with each successive member in abutting engagement with the adjacent preceding member, each intermediate member having a reciprocable piston and hydraulic circuitry cooperable with hydraulic circuitry in the other of said members for hydraulically effecting progressive displacement of the respective pistons from one limiting position to another, the improvment wherein each of said members has a portion overlying a cooperable portion of the adjacent member in direction transverse to said line, respective means extending transversely to said line independently connecting each successive member with the preceding member, the cooperable meeting faces of overlying portions of adjoining members having mating fluid ports opening thereon for the operative connection of the fluid circuitry of such members, with said connecting means applying compression forces on such cooperable meeting faces, one of said members having an inlet port for the lubricant to be distributed and each intermediate member having outlet ports for the discharge of lubricant therefrom.

2. A lubricant distributor according to claim 1, wherein said pairs of cooperable meeting faces lie in a common plane containing said line, and said individual securing means are arranged to apply compression forces in a direction normal to said plane.

3. A lubricant distributor according to claim 1, wherein each of said intermediate members has parallel top and bottom faces, end faces, and a pair of side faces at each abutting side of such member, the side faces of each pair being offset from one another along said line and complementally related to the respective adjacent offset faces of the adjoining member, each pair of offset faces of a member being connected by one of said cooperable meeting faces, with each of said individual securing means connecting each pair of offset portions of adjoining members defined by the respective cooperable meeting faces.

4. A lubricant distributor according to claim 3, wherein said top and bottom faces lie in respective parallel planes, said side faces extending at right angles to the top and bottom faces and said cooperable meeting faces being disposed in a common plane extending parallel to and centered between the planes of said top and bottom faces.

5. A lubricant distributor according to claim 3, wherein each intermediate member has a pair of outlet ports in the top face thereof each of which communicates with an alternate outlet port is a respective end face of such member.

6. A lubricant distributor according to claim 3, wherein one end member is provided with a lubricant inlet port in the free side face thereof.

7. A lubricant distributor according to claim 3, wherein such end member is provided with an alternate inlet port in the top face thereof.

8. A lubricant distributor according to claim 3, wherein said individual securing means for each pair of cooperable faces comprise a plurality of bolts, each of which extends through one of the associated overlying portions of a pair and threaded into the other overlying portion of such a pair.

* * * * *